UNITED STATES PATENT OFFICE.

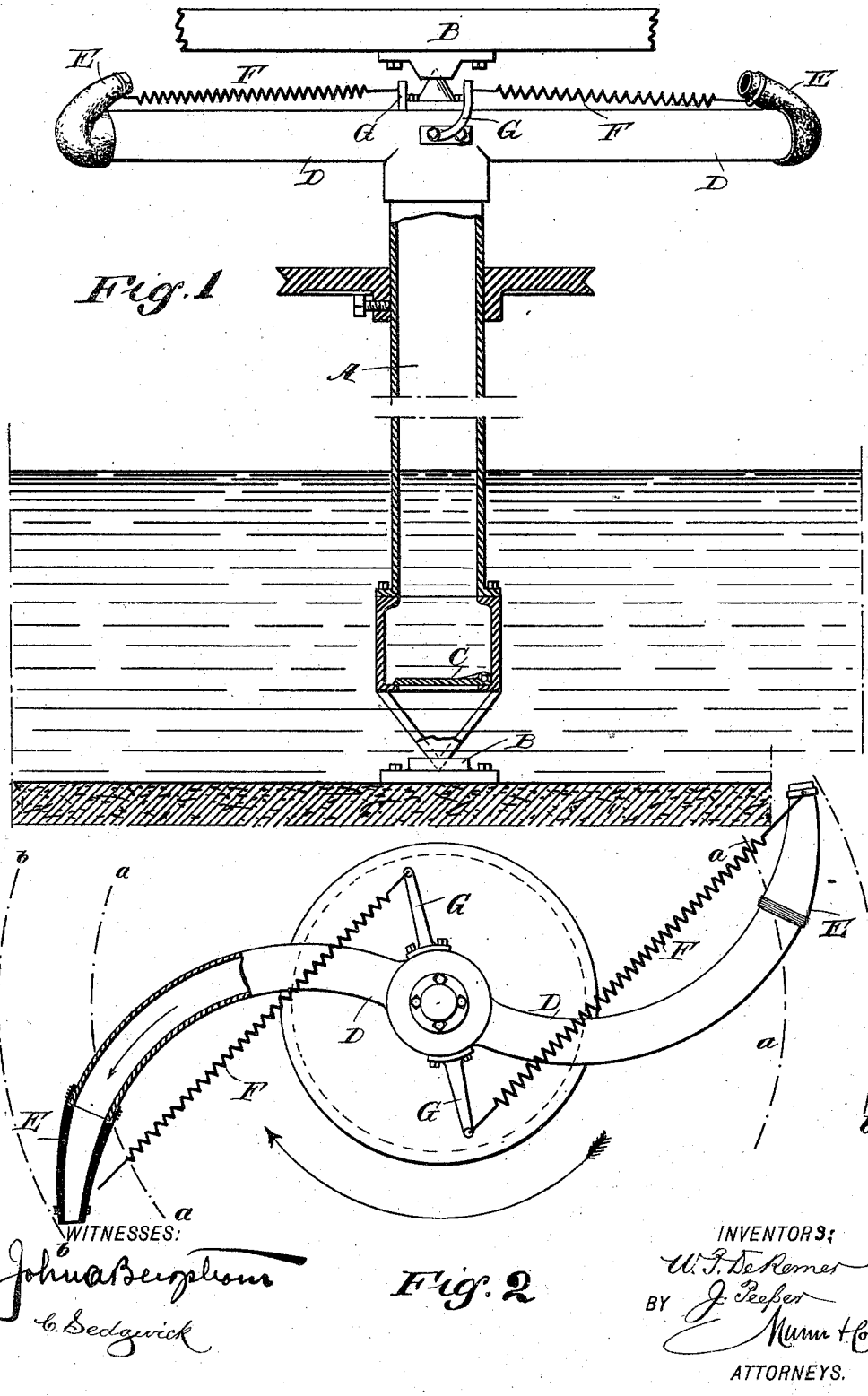

WARREN P. DE REMER AND JOSIAH PEEPER, OF WESTERN UNION, WISCONSIN.

CENTRIFUGAL PUMP.

SPECIFICATION forming part of Letters Patent No. 534,863, dated February 26, 1895.

Application filed February 28, 1894. Serial No. 501,823. (No model.)

*To all whom it may concern:*

Be it known that we, WARREN P. DE REMER and JOSIAH PEEPER, of Western Union, in the county of Racine and State of Wisconsin, have invented a new and Improved Centrifugal Pump, of which the following is a full, clear, and exact description.

The object of the invention is to provide a new and improved centrifugal pump, arranged in such a manner that the priming-holding nozzles automatically adjust themselves to securely hold the priming in place until the centrifugal force becomes greater than the atmospheric pressure, and then to permit a free and natural escape of the water without undue friction and resistance, thus requiring less power to drive the pump.

The invention consists of self-adjusting movable nozzles on the ends of the pump discharge pipes.

The invention also consists of certain parts and details, and combinations of the same, as will be fully described hereinafter and then pointed out in the claims.

Reference is to be had to the accompanying drawings, forming a part of this specification, in which similar letters of reference indicate corresponding parts in both figures.

Figure 1 is a sectional side elevation of the improvement with the nozzles drawn up; and Fig. 2 is a plan view of the same with parts in section and with the nozzles extended.

The improved centrifugal pump is provided with the usual suction pipe A, mounted to rotate in suitable bearings B and driven from a suitable source of power, usually a belt and pulleys connected with an engine or other motor.

In the lower end of the suction pipe A is arranged the suction valve C, and on the upper end of the said pipe A are arranged the discharge pipes D, two or more in number, and each provided on its outer end with a nozzle E made of a flexible material, such as rubber, canvas, leather, &c., the said nozzles being connected with inwardly extending springs F attached to brackets G, fastened on the upper end of the suction pipe, as is plainly shown in the drawings. The springs F normally hold the nozzles E in an upward and inward direction, as is plainly shown in Fig. 1, so that the end of the nozzle is within the inner or priming circle a a as long as the pump is at a standstill.

When the pump is running, the centrifugal force of the water escaping through the pipes D causes the nozzles E to extend in alignment with the pipes D, and in the proper direction, as is plainly indicated in Fig. 2. The ends of the nozzles E are then in the outer or discharging circle b b, so that a free escape of the water takes place in the proper direction and without undue friction or resistance.

It will be seen that as soon as the pump stops running and the centrifugal force of the water diminishes, the springs F will draw the nozzles E upward and inward to the position shown in Fig. 1, so that the water forming the priming for the pump is held in the pipes D and suction pipe A, as the valve C in the bottom thereof is then in a closed position. Thus, it will be seen that the nozzles E automatically adjust themselves to prevent loss of the priming, and to permit a free and natural escape of the water while the pump is running.

It is undertood that the suction pipe A may be stationary and only the arms and their hub revolve on the upper end of the said suction pipe; a gasket joint then being made between hub and pipe. This construction is especially desirable in case the suction pipe is inclined.

Having thus described our invention, we claim as new and desire to secure by Letters Patent—

1. A centrifugal pump provided with discharge pipes, movable nozzles on the ends of the discharge pipes, and means for holding the nozzles in an upward and inward position when the pump is at a standstill to prevent the outflow of water, while allowing the nozzles to swing outward into alignment with the ends of the pipes when the pump is in operation, substantially as described.

2. A centrifugal pump provided with discharge pipes and movable nozzles held on the ends of the said pipes, said nozzles being adapted, when the pump is at a standstill, to assume an angular position relatively to the discharge pipes to prevent the outflow of water therefrom, while when the pump is in operation, the nozzle will be swung into alignment with the ends of the discharge pipes, substantially as described.

3. A centrifugal pump provided with a flexible nozzle on the end of each discharge pipe, and means for drawing the nozzles inward substantially as shown and described.

4. A centrifugal pump provided with a flexible nozzle on the end of each discharge pipe, and a spring for drawing each of the nozzles inward substantially as shown and described.

5. In a centrifugal pump, the combination with the suction pipe having a suction valve, of discharge pipes extending from the said suction pipe, and spring-pressed flexible nozzles held on the outer ends of the said discharge pipes, substantially as shown and described.

WARREN P. DE REMER.
JOSIAH PEEPER.

Witnesses:
SIDNEY A. SAYE,
ALONZO DE REMER.